United States Patent

[11] 3,613,589

[72] Inventors: Maurice Apstein, Bethesda, Md.; Evert Blomgren, Kensington, Conn.; George R. Keehn, Washington, D.C.; Laurence M. Andrews, Silver Spring; Jacob Rabinow, Takoma Park, Md.
[21] Appl. No. 555,216
[22] Filed Dec. 23, 1955
[45] Patented Oct. 19, 1971
[73] Assignee The United States of America as represented by the Secretary of the Army

[54] BOMB FUZING SYSTEM
1 Claim, 4 Drawing Figs.
[52] U.S. Cl. .................................................. 102/70.2 R, 102/71
[51] Int. Cl. .................................................. F42c 11/06, F42c 15/12, F42c 13/04
[50] Field of Search ........................................ 102/70.2

[56] References Cited
UNITED STATES PATENTS

| | | | |
|---|---|---|---|
| 1,133,183 | 3/1915 | Reinehe | 102/70.2 |
| 1,506,785 | 9/1924 | Sperry | 102/70.2 |
| 2,206,446 | 7/1940 | Bereskin | 102/70.2 |
| 2,623,921 | 12/1952 | Smits | 102/70.2 |
| 2,404,553 | 7/1946 | Wales, Jr. | 102/70.2 |
| 2,545,474 | 3/1951 | Kurland et al. | 102/70.2 |
| 2,721,240 | 10/1951 | Tilbert, Jr. | 200/83 |
| 2,721,913 | 10/1955 | Kent, Jr. | 200/83 |
| 2,166,763 | 7/1939 | Mason | 102/18 UX |
| 2,396,914 | 3/1946 | Cook | 102/11 |
| 2,400,257 | 5/1946 | Miller | 102/11 |
| 2,575,071 | 11/1951 | Rochwell | 102/1 |

FOREIGN PATENTS

| | | | |
|---|---|---|---|
| 912,862 | 5/1946 | France | 102/70.2 |
| 1,107,717 | 8/1955 | France | |

Primary Examiner—Benjamin A. Borchelt
Assistant Examiner—Thomas H. Webb
Attorneys—W. E. Thibodeau, A. W. Dew and J. D. Edgerton CLAIM: 1. An aircraft bomb fuzing system that permits the selection of alternative arming-delay and detonation-delay-after-impact times at any time prior to release of the bomb, said system comprising in combination: a first circuit point aboard said aircraft; a DC power source aboard said aircraft connected to said first circuit point for energization thereof with DC voltage; an AC generator aboard said aircraft also connected to said first circuit point, said generator being capable of selectively applying to said first circuit point any predetermined combination of a number of AC signals of different frequencies; means on said bomb and said aircraft for supporting said bomb prior to release thereof; an electrical input terminal aboard said bomb; an extensible and disconnectable conductor means connected between said input terminal and a grounded point on said aircraft for maintaining said input terminal grounded prior to release of said bomb, said conductor means being so constructed and arranged that as the bomb falls away from said aircraft after release thereof, said conductor means first disconnects itself from said grounded point on said aircraft as the bomb begins to fall, the makes momentary electrical contact with said first circuit point after said bomb has fallen a short predetermined distance, and then disconnects itself from said input terminal after said bomb has fallen an additional predetermined short distance, the DC voltage of said DC power source and the predetermined combination of AC signal frequencies from said AC generator thereby being momentarily applied to said input terminal aboard said bomb as said bomb falls away from said aircraft; capacitive storage means within said bomb connected to said input terminal, said capacitive storage means being adapted to charge to the DC voltage of said power source as a result of the momentary application of said DC power source to said input terminal as the bomb falls away from the aircraft; an arming-delay resistance means and an arming-delay capacitor in series across said capacitive storage means; an arming-delay gas diode and an impulse responsive arming means in series across said arming-delay capacitor, said DC voltage on said capacitive storage means flowing through said arming-delay resistance means to charge said arming-delay capacitor which upon attaining a voltage equal to the firing voltage of said arming-delay diode rapidly discharges through said diode and said arming means, said arming means being adapted to thereupon arm said bomb, the arming-delay time thus being the time taken by said arming-delay capacitor to charge to said firing voltage; a normally open impact switch, a detonation-delay resistance means and a detonation-delay capacitance in series across said capacitive storage means; a detonation-delay gas diode and a detonator in series across said detonation-delay capacitor, said impact switch being adapted to close on impact so that said capacitive storage means flows through said detonation-delay resistance means to charge said detonation-delay capacitor which upon attaining a voltage equal to the firing voltage of said detonation-delay diode rapidly discharges through said diode and said detonator, said detonator being adapted to thereupon detonate said bomb, the detonation-delay-after-impact time thus being the time taken by said detonation-delay capacitor to charge to the firing voltage of said detonation-delay diode; a plurality of parallel-connected frequency-sensitive switch devices connected to said input terminal, each of said switch devices comprising a tuned circuit and an irreversible impulse-responsive switch, each tuned circuit being tuned to a different one of the signal frequencies capable of being applied to said first circuit point by said generator, said switch devices being so constructed and arranged that the momentary application of the predetermined combination of AC signal frequencies applied to said input terminal as said bomb falls away causes irreversible actuation of the impulse-responsive switches of those switch devices whose tuned circuit is tuned to one of the signal frequencies present in the predetermined combination applied by said generator; said arming-delay resistance means and said detonation-delay resistance means each comprising a plurality of resistors, the resistors of said arming-delay resistance means being adapted to cooperate with a first number of said impulse-responsive switches so that the resistance provided by said arming-delay resistance means is determined by the number of said first number of impulse-responsive switches which are actuated, and the resistors of said detonation-delay resistance means being adapted to cooperate with a second number of impulse-responsive switches so that the resistance provided by said detonation-delay resistance means is determined by the number of said second number of impulse-responsive switches which are actuated, the arming-delay and detonation-delay-after-impact times, which are dependent on the resistances of said arming-delay resistance means and said detonation-delay resistance means, respectively, thus being selectively variable by choice of the predetermined combination of signal frequencies applied to said first circuit point by said generator.

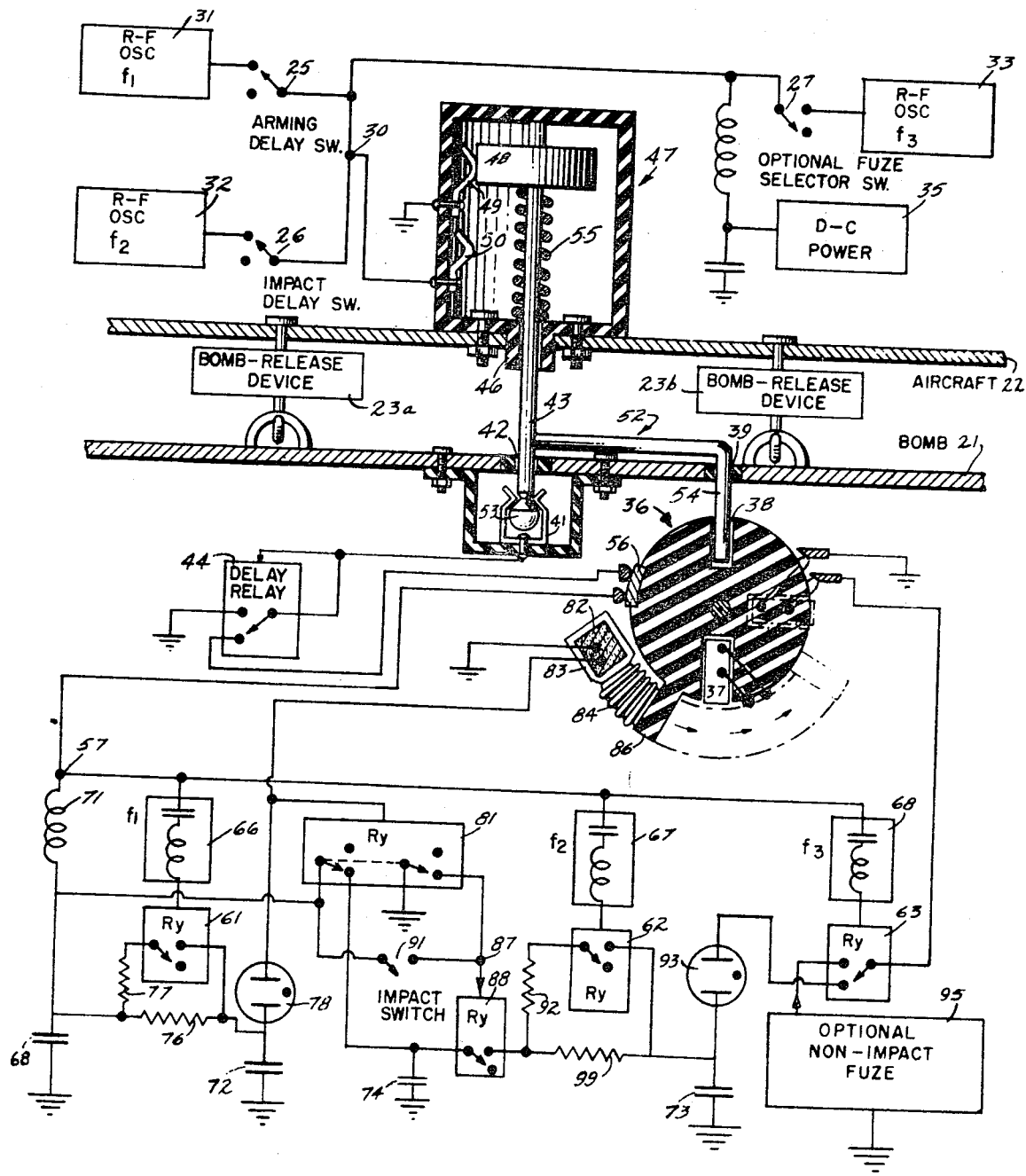

BOMB FUZING SYSTEM

The invention described herein may be manufactured and used by or for the Government for governmental purposes without the payment to us of any royalty thereon.

This invention relates to explosive ordnance devices and more particularly to the fuzing of aircraft-released bombs. An important feature of the invention is the provision of a high-safety aircraft bomb-fuzing system that enables a bombardier revocably to choose alternative fuzing charactristics—e.g., various alternative arming-delay times and impact-delay times—for a bomb at any time up to the instant of release of the bomb from an aircraft.

Typical aircraft-released bombs of the impact-fuzed type are fuzed so as to arm at a predetermined time after release and so as to explode on impact or at a predetermined time after impact. As is well known in the bombing art, the optimum arming delay and the optimum delay after impact depend on the nature of the tactical mission. For example, to minimize the danger to other bombing aircraft flying in formation it is desirable that the arming-delay be such that arming occurs only after the bomb has fallen a considerable distance, though before it reaches its target. This means that low-level bombing requires shorter arming delays than are desirable for high-level bombing. Similarly, instantaneous detonation on impact is desirable in attacking thin or fragile targets, but progressively greater delays after impact may be desirable for targets requiring penetration before detonation and for other tactical purposes.

In the past, preparation for a bombing mission has typically entailed, first, a decision as to the most desirable arming-delay and impact-delay times for the particular mission. From such stocks of fuzes of various characteristics as may be on hand, fuzes having the most suitable characteristics available are then selected. One of these fuzes is then affixed individually to each bomb. The bombs are then loaded into the aircraft bomb bay. If for any reason it is then decided that different fuzing characteristics are desired, the bombs must in general be removed from the bomb bay for the substitution of different fuzes. Once the bomber is aloft it is generally impossible for the bombardier to change the fuzing characteristics to better adapt them to changed tactical situation that may develop. The logistical disadvantages of having to provide different fuzes for different tactical missions, and the tactical disadvantages of not being able to alter fuzing characteristics quickly and easily, are largely apparent.

A principal object of the present invention is to provide a highly safe aircraft bomb fuzing system that will permit the quick, easy, and reversible selection, from within the aircraft, of alternative bomb-fuzing characteristics—e.g., of various alternative arming-delay times and impact-delay times—at any time up to the instant of release of a bomb from an aircraft.

Another object is to provide a multipurpose bomb fuze, having readily selectable alternative arming times and impact-delay times, adapted to replace a number of hitherto-needed different bomb fuzes and thus to simplify logistical problems.

Still another object is to provide a system, controllable from aboard an aircraft, for altering any of a number of characteristics of a bomb released from the aircraft.

Yet another object is to provide means for the remote setting of one or more characteristics of an explosive ordnance device.

A further object is to provide improved devices for accomplishing at least one irreversible electrical switching operation in response to an electrical actuating impulse.

Briefly, in a preferred embodiment of the invention release of the bomb from the aircraft is accompanied by the automatic application to the bomb—for a short period as it starts downward, through an extensible and disconnectable single conductor extending from the interior of the aircraft to the bomb—of (a) DC energy that charges a power capacitor within the bomb and also, at the option of the bombardier, of (b) RF energy of one or more frequencies that actuates irreversibly one or more frequency-sensitive switching devices within the bomb. These switching devices are adapted to alter resistance or capacitance values in resistance-capacitance arming-delay and impact-delay circuits, and thus to alter the arming-delay and impact-delay times. Instead of or in addition to actuating switching devices, the RF energy may be utilized to actuate mechanical-delay trains or other devices aboard the bomb. The bombardier, at any time prior to release of the bomb, is able manually to set appropriately calibrated arming-delay and impact-delay selector switches that determine which RF frequencies will be applied to the bomb on release and that thus determine which of the frequency-responsive devices aboard the bomb will be actuated. Explosive-type switching devices of novel construction are provided. Although the invention is applicable primarily to bomb fuzing, it will become apparent that the invention is also applicable to other ordnance devices.

Other objects, aspects, uses, and advantages of the invention will become apparent from the following detailed description and from the accompanying drawing, in which—

Figure 1:
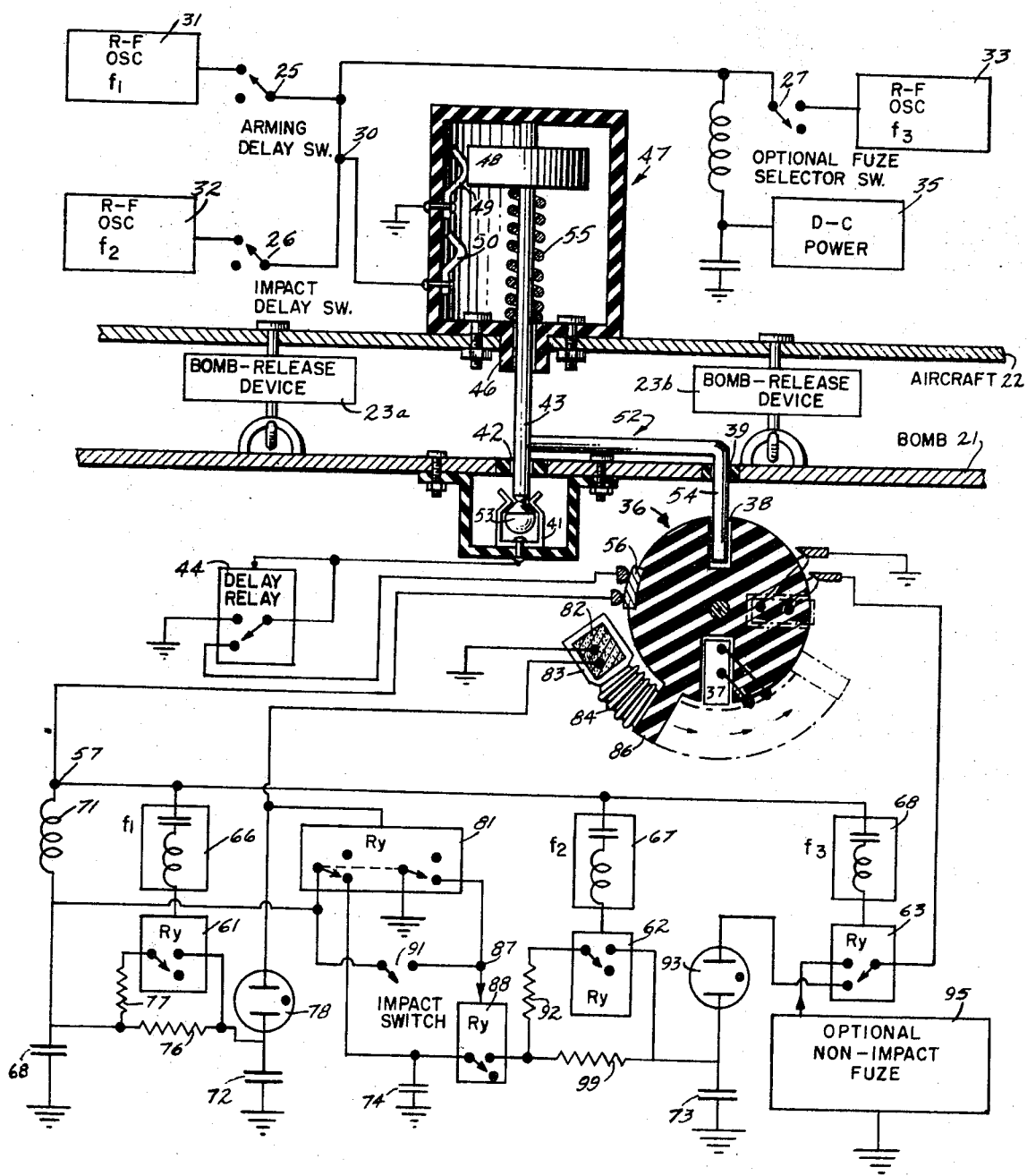
FIG. 1 is a diagram of a preferred bomb fuze system in accordance with the invention.

In FIG. 1 a bomb 21 is represented positioned beneath an aircraft 22. Support and release of bomb 21 is controlled by bomb-release devices 23a and 23b which may be of well-known types.

Aboard aircraft 22, for manual operation by a bombardier, are three selector switches—an arming delay selector switch 25, an impact delay selector switch 26, and an optional fuze selector switch 27. The rotating arms of all three switches are connected to a common circuit point 30. Switches 25, 26, and 27 are each adapted to optionally connect the output of at least one audio- or radiofrequency oscillator 31, 32, and 33 respectively to circuit point 30. The frequencies of the various oscillators 31, 32, 33 are all different. Depending, then, on the settings of switches 25, 26, and 27, circuit point 30 may receive no radiofrequency energy via switches 25, 26, and 27 or may receive radiofrequency energy of one or more frequencies simultaneously. In addition, circuit point 30 is energized at all times with a DC potential from a DC power source 35.

An important element aboard bomb 21 is a rotor 36 that carries a detonator 37. To simplify insulation problems, rotor 36 may be made of an electrical nonconductor, as shown. In accordance with well-known fuzing practice, rotor 36 is adapted to be rotated from a first or unarmed position to a second or armed position. The solid portions of the drawing show rotor 36 and detonator 37 in the unarmed position. The dashed outline shows the position of detonator 37 (and certain related structure) after rotor 36 has rotated 90 degrees counterclockwise to the armed position. To avoid cluttering the drawing unnecessarily, some portions of the rotor 36 structure are shown only in the unarmed position.

Rotor 36 is mounted near the outer wall of bomb 21 and is provided with a locking recess 38. When rotor 36 is in the unarmed position, locking recess 38 is aligned with a hole 39 in the outer wall of bomb 21.

A spring-grip electrical socket 41 is insulatedly mounted near rotor 36 and also near the outer wall of bomb 21. Socket 41 is aligned with another hole 42 in the wall of bomb 21.

Socket 41 is electrically connected to the actuating impulse input terminal, and also to the moving contact member, of a delayed-action electrical-impulse-responsive irreversible single-pole double-throw switching device 44. Prior to the application of an electrical signal to socket 41, and provided rotor 36 is in the unarmed position, socket 41 is electrically connected, through a circuit that includes device 44 and metallic contact member 56 affixed to rotor 36, to a circuit point 57. A short time—typically, a small fraction of a second—after the application of an electrical signal to socket 41, device 44 functions to disconnect socket 41 from electrical connection with contact member 56 and thus from electrical connection with circuit point 57, and—preferably—to connect socket 41 to ground.

An extensible electrical conductor 43 in the general form of a metal rod extends slidably through an insulating bushing 46. Bushing 46, which is preferably integral with an insulating housing 47, extends through the under surface of aircraft 22. Near its upper end conductor 43 is provided with an enlarged portion 48 adapted to make sliding contact with spring contacts 49 and 50 that are mounted on insulated housing 47. At its lower end electrical conductor 43 is provided with a two-prong plug 52 having a main prong 53 and a safety prong 54. A helical spring 55 biases conductor 43 in an upwardmost position.

In the course of the raising of bomb 21 toward its normal prerelease position on the underside of aircraft 22, hole 39 admits safety prong 54. If rotor 36 should by any mischance not be in the unarmed position, locking recess 38 will not be aligned with hole 39, in which case safety prong 54 will be able to pass only a short distance through hole 39. Under these circumstances main prong 53 is prevented from entering hole 42 sufficiently far to make electrical contact with socket 41.

Provided, then, that rotor 36 is in the unarmed position, locking recess 38 and spring grip socket 41 admit safety prong 54 and main prong 53 respectively as bomb 21 is moved upward into position on the underside of aircraft 22. Bomb-release devices 23a and 23b are adapted to hold bomb 21 in the just-described position until release of bomb 21 is desired. As long as bomb 21 is in this position, the presence of safety prong 54 in locking recess 38 keeps rotor 36 locked in the unarmed position.

During the positioning of bomb 21 on the underside of aircraft 22 extensible conductor 43 remains in its upwardmost position. In this position enlarged portion 48 presses against grounded spring contact 49, so that extensible conductor 43 is electrically grounded in its entirety.

When bomb-release devices 23a and 23b are actuated bomb 21 begins to fall away from aircraft 22. Spring-grip socket 41 holds main prong 53 sufficiently tightly to insure that, during the early stages of the fall of bomb 21, the upward bias of spring 55 is overcome and conductor 43 is drawn downward. During a first stage of the fall of bomb 21 enlarged portion 48 remains in contact with spring contact 49, so that conductor 43 remains electrically grounded. During a second stage of the fall of bomb 21 enlarged portion 48 is in contact with spring contact 50 and is no longer in contact with spring contact 49.

During this second stage of the fall of bomb 21 there is applied through contact 50 to conductor 43—and thence through socket 41, device 44, and contact element 56 to circuit point 57—DC energy from DC power source 35 and also, optionally, as determined by the settings of selector switches 25, 26, and 27, alternating current of one or more frequencies.

Irreversible impulse-responsive switching devices 61, 62, and 63 have their actuating impulse input terminals coupled to circuit point 57 through frequency selective coupling devices 66, 67, and 68 respectively. Devices 66, 67, and 68 are peaked respectively at the frequencies of oscillators 31, 32, and 33 and each is sufficiently selective to be substantially unresponsive to other oscillator frequencies. Accordingly, it will be understood that during the aforementioned second stage of fall of bomb 21 one or more of switching devices 61, 62, and 63 aboard bomb 21 may be irreversibly actuated, in accordance with the positions to which selector switches 25, 26, and 27 aboard aircraft 22 have been set.

A first DC storage capacitor 68 is connected to circuit point 57 through an RF choke 71. A second DC storage capacitor 74 is initially connected in parallel with capacitor 68 but, as will further appear below, switch 81 subsequently disconnects capacitor 74 from capacitor 68. It will be understood that, during the same second stage of fall of bomb 21, capacitors 68 and 74 become charged.

During a third stage of the fall of bomb 21 enlarged portion 48 has passed beyond spring contact 50 and conductor 43 has thus become electrically disconnected from circuit point 30. This third stage ends when conductor 43 reaches the downwardmost limit of its travel, as determined by enlarged portion 48 and by the minimum compressed height of spring 55.

At the end of this third stage, spring-grip socket 41 pulls free of prong 53. Because conductor 43 has already been disconnected from circuit point 30, there is no possibility of undesirable sparking between socket 41 and prong 53 upon separation. Safety prong 54 simultaneously becomes withdrawn from locking recess 38, unlocking rotor 36.

It will be understood that the distances involved in the above-discussed first, second, and third stages of the downward fall of bomb 21 are determined principally by the positions and dimensions of spring contacts 49 and 50 and by the thickness of extended portion 48. It is feasible to have the third stage end—i.e., to have bomb 21 pull free of prongs 43 and 54— after only a few inches of total travel. DC power source 35 preferably has low internal resistance, so that capacitor 68 charges rapidly.

As soon as capacitors 68 and 74 are charged, arming delay capacitor 72 starts to draw charge therefrom through first arming delay resistor 76 and—if irreversible switching device 61 has been actuated—through second arming delay resistor 77 in parallel therewith. As soon as the voltage across capacitor 72 reaches a critical value determined by the characteristics of gas diode 78, the latter fires and passes a pulse of electrical energy. It will be understood that the rate at which capacitor 72 charges, and thus the time at which diode 78 fires, is dependent upon whether or not switching device 61 has been actuated, which in turn is dependent upon the position of arming delay selector switch 25 at the time of release of bomb 21.

Capacitor 74 is preferably of approximately the same capacitance as capacitor 68, while capacitors 72 and 73 are both preferably of substantially smaller capacitance.

The energy passed by diode 78 upon firing is utilized (a) to cause rotor 36 to carry detonator 37 from the unarmed to the armed (dashed outline) position and also (b) to actuate a double-poled irreversible switching device 81.

Various ways of utilizing a pulse of electrical energy to cause rotor 36 to rotate to the armed position will suggest themselves to skilled persons. We prefer to use the electrical pulse from diode 78 to detonate a small quantity of explosive powder 82 in a small explosion chamber 83 to which is attached an expansible bellows 84 the other end of which is fastened to a projection 86 on rotor 36. Upon the detonation of powder 82 expanding gases generated thereby cause the expansion of bellows 84 thus driving projection 86 and thereby rotor 36 counterclockwise through a 90 degree arc to the armed position. We have obtained good results with a bellows 84 made of soft brass.

Switching device 81, upon actuation by an electrical pulse from diode 78, performs two irreversible switching operations. First, it disconnects second DC storage capacitor 74 from first DC storage capacitor 68. Second, it simultaneously ungrounds the actuating impulse input terminal 87 of an electrical-impulse-responsive irreversible switching device 88. An impact-sensitive switch 99 which is adapted to close at least momentarily in response to impact of bomb 21 with a target and which may be of a well-known type, is connected between terminal 87 and first DC storage capacitor 68. From what has been said above it will be understood that, if an impact should cause the closing of switch 91 before arming delay capacitor 72 has attained the voltage necessary to fire diode 78, switch 88 will not be actuated; rather, both DC storage capacitors 68 and 74 will be discharged to ground, making subsequent arming and detonation substantially impossible.

However, an impact causing the closing of impact switch 91 after diode 78 has fired will cause the actuation of switching device 88. The energy required for this actuation is taken substantially entirely from first DC storage capacitor 68, which may at this time thus lose substantially all of its remaining charge. Second DC storage capacitor 74 contributes no energy to this actuation.

This actuation of switching device 88 in response to impact causes second DC storage capacitor 74 to charge an impact-delay capacitor 73 through a first impact delay resistor 91 and—if irreversible switching device 62 has been actuated—through second impact delay resistor 92 in parallel therewith. As soon as the voltage across capacitor 73 reaches a critical value determined by the characteristics of a second gas diode 93, the latter fires and passes a pulse of electrical energy. It will be understood that the rate at which capacitor 73 charges, and thus the time after impact at which diode 93 fires, is dependent upon whether or not switching device 62 has been actuated, which in turn is dependent upon the position of impact delay selector switch 26 at the time of release of bomb 21.

If electrical-impulse-responsive irreversible switching device 63 has not been actuated, the pulse of electrical energy passed by diode 93 is applied through device 63 to detonator 37 and causes the detonation of bomb 21. If device 63 has been actuated, however, detonator 37 will have thereby become connected to the output of optional nonimpact fuze 95 rather than to diode 93. In this case the electrical pulse passed by diode 93 will have no effect; rather, detonator 37 will detonate bomb 21 whenever detonator 37 receives an appropriate electrical output signal from optional fuze 95. Optional fuze 95 may be, for example, of a proximity type or of a time-delay type. It will be understood that the actuation or nonactuation of device 63 is determined by the position of optional fuze selector switch 27 at the time of release of bomb 21.

It will be readily understood that the switching operations performed by device 81 may alternatively be performed by an arrangement of electrical contacts carried by rotor 36.

The embodiment of the invention shown in FIG. 1 and described above provides only two choices of arming delay and only two choices of impact delay. However, it will be apparent that any desired number of such choices may be provided by providing additional oscillators 31, 32, etc., of different frequencies and by providing additional switching devices 61, 62, etc., each adapted to respond to but a single frequency, to connect additional resistors into the arming-delay and impact-delay circuits.

It will be understood that well-known latching relays and the like may be used as electrical-impulse-responsive irreversible switching devices 44, 61, 62, 63, 81, and 88. However, we prefer to use novel explosive-type switching devices of which representative preferred forms are shown in FIGS. 2, 3, and 4.

Figure 2:
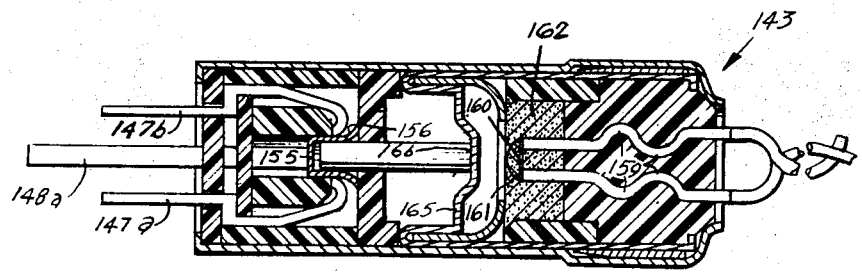
FIG. 2 is an axial section of a preferred explosive switch (in the unactuated condition) in accordance with the invention.

FIG. 2 shows an axial section of a quick-acting explosive switch 143 in accordance with the invention, prior to actuation. FIG. 3 is a partial axial section taken at an angle of 90 degrees with respect to the FIG. 2 axial section, and shows the switch after actuation. The principal electrical elements are a first pair of metallic contact fingers 147a and 147 b located at right angles to contact fingers 147a and 147 b, a second pair of metallic contact fingers 148a and 148b, and a flared movable contact cup 155. In the unactuated position contact cup 155 provides an electrical short circuit between contacts 147a and 147b. Cup 155 is mounted on a shaft 166 of insulating material the other end of which is in contact with a soft metal deformable diaphragm member 165. On the other side of diaphragm member 165 is a main charge of explosive material 162 in which is embedded a pair of electrical leads 159 shorted by a fine wire bridge 160 in contact with an ignition charge 161. Application of a suitable electrical signal to leads 159 causes the temperature of bridge 160 to rise sufficiently to ignite ignition charge 161, which in turn ignites main charge 162. The combustion of charge 162 produces a rapid leftward movement of deformable diaphragm member 165, shaft 166, and contact cup 155. This leftward movement causes cup 155 to unshort circuit contact fingers 147a and 147b and to short circuit contact fingers 148a and 148b.

Cup 155 preferably has a flare 156 that prevents premature leftward motion of cup 155 but that yields in response to the explosion of charge 162.

Figure 3:
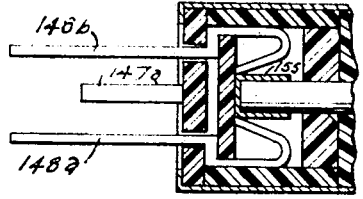
FIG. 3 is a partial axial section of the switch of FIG. 2 after actuation. The FIG. 3 axial section is taken at an angle of 90 degrees with respect to the FIG. 2 axial section.
Figure 4:
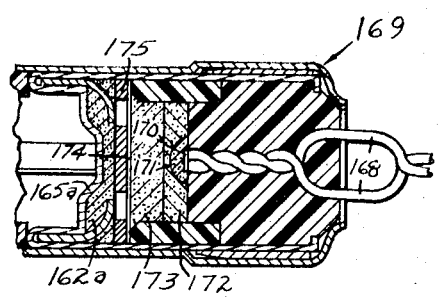
FIG. 4 is an axial section of the explosive or motor end of a delayed-action explosive switch in accordance with the invention.

FIG. 3 shows the position of cup 155 after switch 143 has been actuated. Fingers 148a and 148b are located leftward of fingers 147a and 147 b. The planes of the two pairs of fingers are preferably at right angles to each other.

It will be understood that additional fixed contacts and additional moving contacts may readily be provided within the scope of the invention.

FIG. 4 shows the rightward or motor end of a novel delayed-action explosive switch 169 in accordance with the invention. The leftward or electrical end of switch 169 may be similar to that of switch 143 shown in FIGS. 2 and 3.

In FIG. 4 means, which may consist of a pair of wire leads 168 shorted by a carbon bridge 170 which contacts an ignition charge 171, are provided for the rapid electrical ignition of a transverse layer of flash powder 172. Upon ignition, powder 172 promptly ignites the rightward end of a transverse layer of pyrotechnic delay powder 173 having appreciable thickness. An appreciable time, determined by the thickness and characteristics of delay powder 173, is required for the propagation of combustion from the rightward end to the leftward end of delay powder 173. A thin paper separator 174 and a perforated metal disc 175 at the leftward end of delay powder 173 help keep delay powder 173 properly positioned but permit the leftward propagation of flame and hot gases to ignite a main charge 162 a that is in contact with deformable diaphragm 165a. It will thus be understood that there is a delay, determined principally by the thickness and combustion characteristics of delay powder 173, between the time at which an actuating impulse of electrical energy is applied to leads 168 and the time at which main charge 162a drives diaphragm 165a leftward to cause the performance of desired electrical switching operations.

It will be apparent that the embodiments shown are only exemplary and that various modifications can be made in construction and arrangement within the scope of the invention as defined in the appended claims.

It will be apparent that the invention is not limited to bomb fuzes. For example, we contemplate embodiments of our invention in which a rocket or other projectile would, during launching, receive from an external source alternating current energy of one or more frequencies. This energy would actuate alternating current responsive elements inside the rocket. These elements, upon actuation, would be adapted to start an arming sequence or to establish desired fuzing characteristics, for example.

We claim:

1. An aircraft bomb fuzing system that permits the selection of alternative arming-delay and detonation-delay-after-impact times at any time prior to release of the bomb, said system comprising in combination: a first circuit point aboard said aircraft; a DC power source aboard said aircraft connected to said first circuit point for energization thereof with DC voltage; and AC generator aboard said aircraft also connected to said first circuit point, said generator being capable of selectively applying to said first circuit point any predetermined combination of a number of AC signals of different frequencies; means on said bomb and said aircraft for supporting said bomb prior to release thereof; an electrical input terminal aboard said bomb; an extensible and disconnectable conductor means connected between said input terminal and a grounded point on said aircraft for maintaining said input terminal grounded prior to release of said bomb, said conductor means being so constructed and arranged that as the bomb falls away from said aircraft after release thereof, said conductor means first disconnects itself from said grounded point on said aircraft as the bomb begins to fall, then makes momentary electrical contact with said first circuit point after said bomb has fallen a short predetermined distance, and then disconnects itself from said input terminal after said bomb has fallen an additional predetermined short distance, the DC voltage of said DC power source and the predetermined combination of AC signal frequencies from said AC generator thereby being momentarily applied to said input terminal aboard said bomb as said bomb falls away from said aircraft; capacitive storage means within said bomb connected to said input terminal, said capacitive storage means being adapted to charge to the DC voltage of said power source as a result of the momentary application of said DC power source to said input terminal as the bomb falls away from the aircraft; an arming-delay resistance means and an arming-delay capacitor in series across said capacitive storage means; an arming-delay gas diode and an impulse responsive arming means in series across said arming-delay capacitor, said DC voltage on said capacitive storage means flowing through said arming-delay resistance means to charge said arming-delay capacitor which upon attaining a voltage equal to the firing voltage of said arming-delay diode rapidly discharges through said diode and said arming means, said arming means being adapted to thereupon arm said bomb, the arming-delay time thus being the time taken by said arming-delay capacitor to charge to said firing voltage; a normally open impact switch, a detonation-delay resistance means and a detonation-delay capacitance in series across said capacitive storage means; a detonation-delay gas diode and a detonator in series across said detonation-delay capacitor, said impact switch being adapted to close on impact so that said capacitive storage means flows through said detonation-delay resistance means to charge said detonation-delay capacitor which upon attaining a voltage equal to the firing voltage of said detonation-delay diode rapidly discharges through said diode and said detonator, said detonator being adapted to thereupon detonate said bomb, the detonation-delay-after-impact time thus being the time taken by said detonation-delay capacitor to charge to the firing voltage of said detonation-delay diode; a plurality of parallel-connected frequency-sensitive switch devices connected to said input terminal, each of said switch devices comprising a tuned circuit and an irreversible impulse-responsive switch, each tuned circuit being tuned to a different one of the signal frequencies capable of being applied to said first circuit point by said generator, said switch devices being so constructed and arranged that the momentary application of the predetermined combination of AC signal frequencies applied to said input terminal as said bomb falls away causes irreversible actuation of the impulse-responsive switches of those switch devices whose tuned circuit is tuned to one of the signal frequencies present in the predetermined combination applied by said generator; a said arming-delay resistance means and said detonation-delay resistance means each comprising a plurality of resistors, the resistors of said arming-delay resistance means being adapted to cooperate with a first number of said impulse-responsive switches so that the resistance provided by said arming-delay resistance means is determined by the number of said first number of impulse-responsive switches which are actuated, and the resistors of said detonation-delay resistance means being adapted to cooperate with a second number of impulse-responsive switches so that the resistance provided by said detonation delay resistance means is determined by the number of said second number of impulse-responsive switches which are actuated, the arming-delay and detonation-delay-after-impact times, which are dependent on the resistances of said arming-delay resistance means and said detonation-delay resistance means, respectively, thus being selectively variable by choice of the predetermined combination of signal frequencies applied to said first circuit point by said generator.